No. 654,349. Patented July 24, 1900.
S. T. JOHNSON.
AX.
(Application filed Oct. 4, 1899.)
(No Model.)
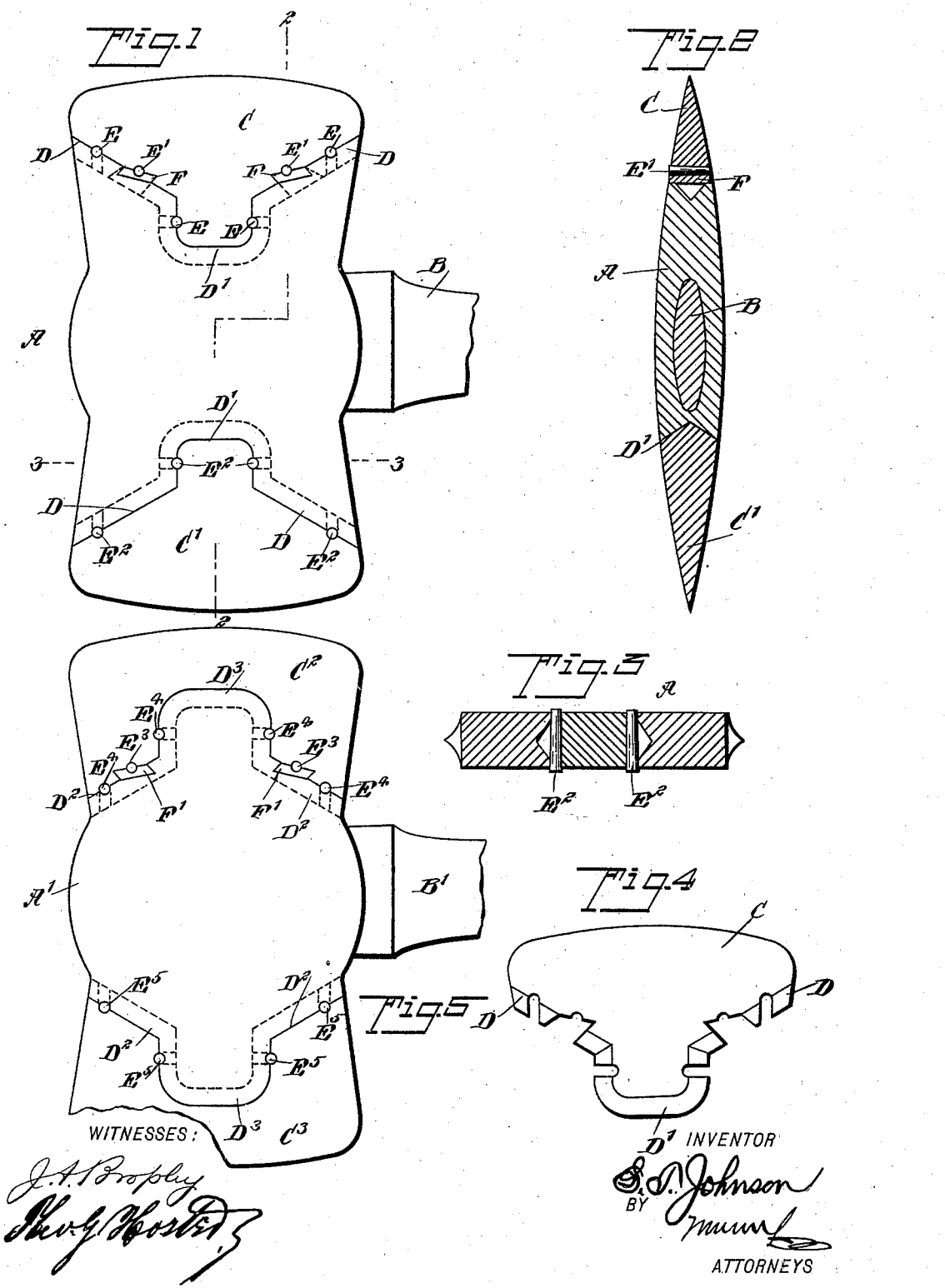
WITNESSES:
INVENTOR
BY
ATTORNEYS

UNITED STATES PATENT OFFICE.

SIEVE THEODORE JOHNSON, OF TRINIDAD, CALIFORNIA.

AX.

SPECIFICATION forming part of Letters Patent No. 654,349, dated July 24, 1900.

Application filed October 4, 1899. Serial No. 732,496. (No model.)

*To all whom it may concern:*

Be it known that I, SIEVE THEODORE JOHNSON, of Trinidad, in the county of Humboldt and State of California, have invented certain new and useful Improvements in Axes, of which the following is a full, clear, and exact description.

The object of the invention is to provide certain new and useful improvements in axes whereby the cutting-blade can be readily attached to or removed from the head to permit of using different forms of cutting-blades on said head and to permit of conveniently and quickly removing a worn-out or dull cutting-blade and replacing it by a new one.

The invention consists of novel features and parts and combinations of the same, as will be fully described hereinafter and then pointed out in the claim.

A practical embodiment of my invention is represented in the accompanying drawings, forming a part of this specification, in which characters of reference indicate corresponding parts in all the views.

Figure 1 is a side elevation of the improvement as applied to a two-bit ax. Fig. 2 is a transverse section of the same on the line 2 2 in Fig. 1. Fig. 3 is a sectional plan view of the same on the line 3 3 in Fig. 1. Fig. 4 is a side elevation of one of the cutting-blades, and Fig. 5 is a side elevation of a modified form of the improvement.

The improved ax shown in Figs. 1, 2, 3, and 4 is provided with a head A, having the usual eye for receiving the end of a handle B, and said head carries on opposite sides cutting-blades C C', each having a V-shaped tongue-and-groove joint or connection with the head A, said joint extending along inwardly-inclined straight lines D, terminating at the outer ends of a U-shaped line D', as will be readily understood by reference to Fig. 1.

In order to fasten the cutting-blade C to the corresponding end of the head A, I provide transverse pins E, passing through the members of the joint along the lines D D' to prevent displacement or disconnection of the blade C from the head A. For very heavy cutting-blades, such as indicated by the blade C, I provide transverse keys F, passing through the members of the joint and secured or locked in place by transverse pins E', as is plainly indicated in Figs. 1 and 2. For lighter cutting-blades, such as indicated by the blade C', I omit the keys F and only employ transverse pins E², engaging the members of the joint along the lines D and the vertical ends of the U-shaped line D'.

From the foregoing it is evident that by the arrangement described the cutting-blades are prevented from moving in a longitudinal direction owing to the peculiar form of the joint and are not liable to move transversely owing to the V-shaped form of the tongue-and-groove members of the joint, and by having the keys and pins, or either of them, the blades are prevented from moving in an outward direction from the head A.

In the modified form shown in Fig. 5 the shape of the joint is reversed—that is, the lines D² are inclined inwardly and outwardly, the U-shaped lines D³ likewise extending outward instead of inward, as indicated in Fig. 1. Otherwise the construction is the same—that is, the blades C² C³ are connected with the head A' by a joint made by V-shaped tongues and grooves, and pins E³ are employed for locking the keys F' in place, and additional pins E⁴ are employed for fastening the members of the joint together, the same as above described relatively to the blade C. The blade C³ has the members of its joint fastened together by transverse pins E⁵, the same as the pins E², indicated as fastening the blade C'. (Shown in Fig. 1.)

From the foregoing it is evident that by removing the pins or keys, or both, the cutting-blade C, C', C², or C³ can be readily removed from the head A, and another differently shaped or sharpened blade may be put in position on the head and secured in place thereon by reinserting the pins or keys, so that the ax can be used by the operator the same as before. Thus differently-shaped blades can be used on the same ax and a dull blade can be readily removed at any time and replaced by a sharp one. Furthermore, the same head and handle can be used for a considerable length of time, blades being inserted therein from time to time and replaced by new ones in case they become worn out, broken, or dulled.

Having thus fully described my invention, I claim as new and desire to secure by Letters Patent—

An ax comprising a head provided with a V-shaped grooved edge or blade-seat, the outline of which is U-shaped at its central portion and divergent at the side portions from the central portion to the side edges of the head, a blade fitted to enter said seat, angular keys passing transversely between the edges of the V-shaped groove of the head and the blade at the divergent side portions of the blade-seat, and pins passing transversely between the edges of the blade and the said angular keys.

SIEVE THEODORE JOHNSON.

Witnesses:
  M. T. BELL,
  C. A. MINER.